United States Patent [19]

Elias

[11] 4,065,676
[45] Dec. 27, 1977

[54] BATTERY BACKUP FOR AC POWERED DC SUPPLY

[75] Inventor: Jack Elias, Lansdale, Pa.

[73] Assignee: Honeywell Inc., Minneapolis, Minn.

[21] Appl. No.: 692,127

[22] Filed: June 2, 1976

[51] Int. Cl.² .............................................. H02J 9/00
[52] U.S. Cl. ........................................ 307/66; 307/87
[58] Field of Search ...................... 307/66, 64, 87, 86, 307/85

[56] References Cited

U.S. PATENT DOCUMENTS

| | | | |
|---|---|---|---|
| 3,480,791 | 11/1969 | Lesher | 307/66 |
| 3,509,357 | 4/1970 | Studtman | 307/64 |

Primary Examiner—Herman J. Hohauser
Attorney, Agent, or Firm—Laurence J. Marhoefer; Lockwood D. Burton; Mitchell J. Halista

[57] ABSTRACT

A battery backup system for an AC energized DC supply has an AC line monitor for producing a pulse signal having a pulse width dependent on rise time of the AC signal and a frequency dependent on zero line crossings of the AC signal. The pulse signals are checked for frequency and pulse width by being used to control the charging time of a timing capacitor for a timer and to be compared with the pulse width of a predetermined reference pulse, respectively. The occurrence of a defect in the pulse signals stemming from either pulse testing criteria is effective to trigger an SCR circuit into conduction to connect a backup battery to the load devices to replace the DC power formerly being supplied by the AC line. After restoration of the AC power, the backup battery is removed following a fixed time delay to allow the AC powered DC supply to stabilize. A battery charging power supply is connected to the backup battery and is automatically switched between a battery "float-rate" and a "high-rate" charging operation following an AC outage and returned when the charging current indicates that the backup battery is fully charged.

10 Claims, 3 Drawing Figures

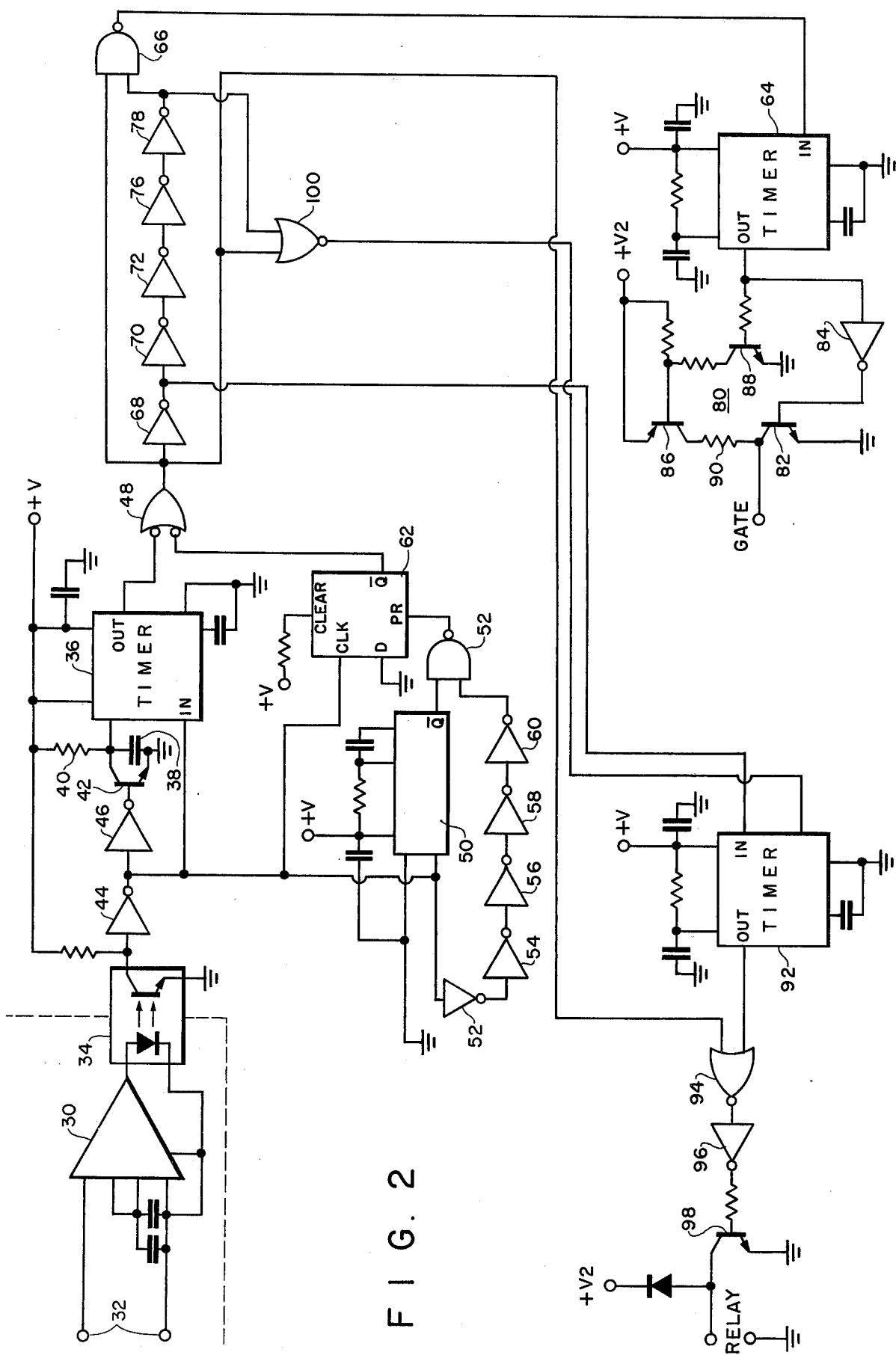
F I G. 2

BATTERY BACKUP FOR AC POWERED DC SUPPLY

BACKGROUND OF THE INVENTION

1. Field of the Invention

The present invention relates to a direct current power supply. More specifically, the present invention relates to a battery backup system for an alternating current powered direct current power supply.

2. Description of the Prior Art

Prior art approaches to battery backup systems for AC energized DC supplies have included a backup battery which is selectively switched to the input of a linear voltage regulator upon failure of an alternating current, or AC, source supplying the regulator, a battery continuously connected, or "floated", directly across the output of a direct current, or DC, power supply, a battery connected across the output of a direct current power supply with a diode coupling which is normally reversed bias by the output of the regulated power supply, and other similar battery backup schemes. The prior art battery backup system wherein the backup battery was used as the input to the regulator had the disadvantages of being dependent on the reliability of the regulator and involving high power dissipation during both battery and normal AC operation. The prior art backup system using a battery connected directly across the power supply output has the disadvantage that the AC supply must have very good regulation and must be large enough to handle the power for the load and to charge the battery at the same time. The prior art backup system having a battery coupled through a diode to the output line also requires a power supply with good regulation to keep the diode reversed biased under normal conditions. Accordingly, it is desirable to provide a battery backup unit that has high efficiency during both AC and battery operation as well as having a measure of independence from the operation of the regulated DC power supply normally supplying DC power to a load.

SUMMARY OF THE INVENTION

Accordingly, an object of the present invention is to provide an improved battery backup system for an AC powered DC supply capable of being independent of the operation of the DC power supply as well as having an high efficiency of system operation during both AC and battery operation.

In accomplishing this and other objects, there has been provided herein, in accordance with the present invention, a battery backup system for an AC powered DC supply having a pair of output terminals for connection in parallel to the DC supply, a backup battery, circuit means connecting the battery across the terminals, and including a selctively operable switching means interposed between the battery and at least one of the terminals and a control circuit for monitoring the AC source and selectively operating the switching means in the event of an AC power outage. The control circuit monitors the pulse and frequency of the AC signal and produces a switching means operation to connect the battery to the terminals upon a detection of an error in either characteristic of a normal AC signal. The control circuit also restores the switching means to disconnect the battery following a restoration of the AC power and controls the recharging of the battery to maintain its operating state.

BRIEF DESCRIPTION OF THE DRAWINGS

A better understanding of the present invention may be had when the following detailed description is read in connection with the accompanying drawings, in which:

FIG. 2 is a detailed schematic of a portion of a control circuit suitable for operating the battery backup system shown in FIG. 1.

DETAILED DESCRIPTION

Figure 1:
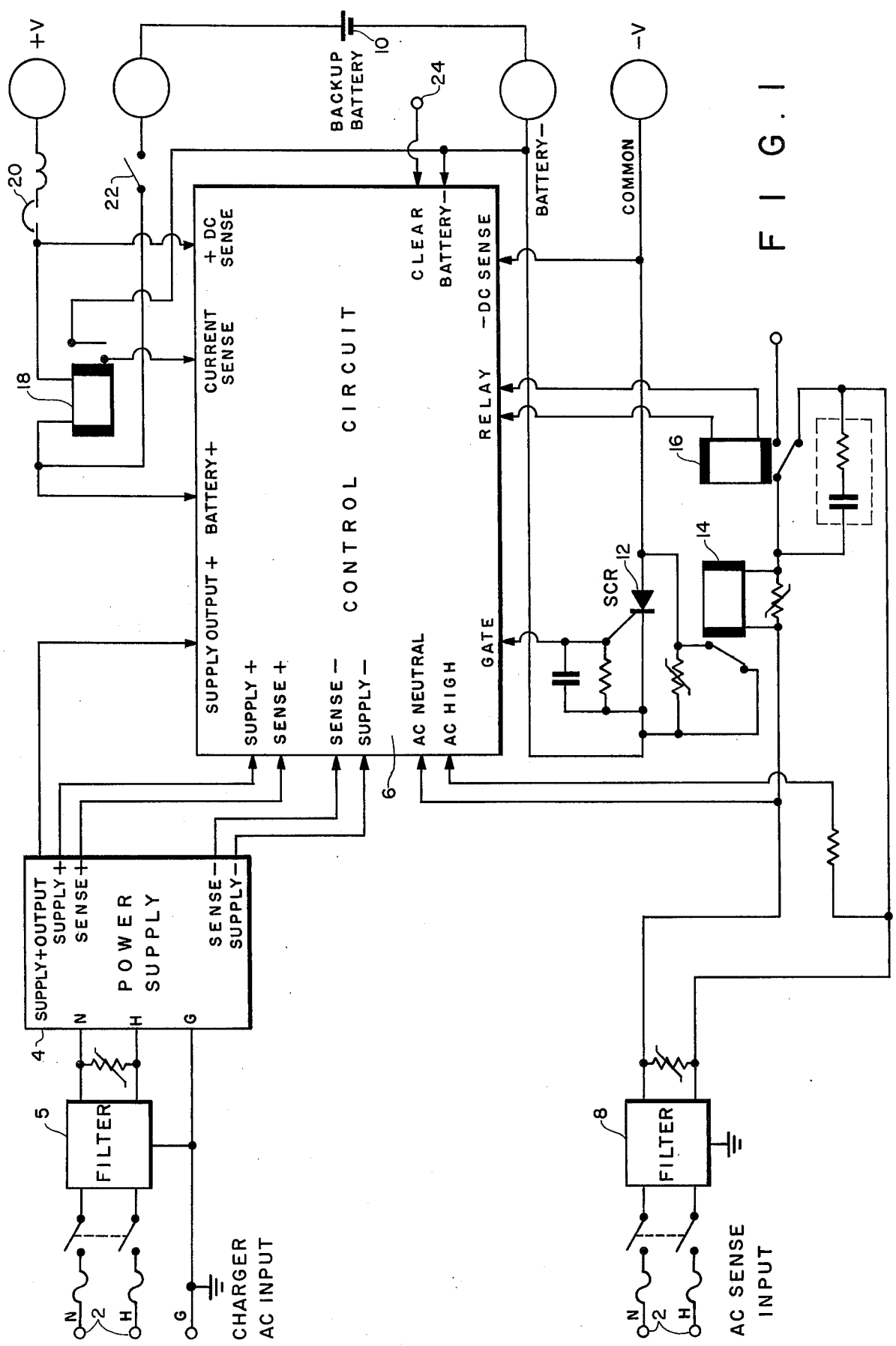
FIG. 1 is a block diagram of a battery backup system embodying the present invention.

Referring to FIG. 1 in more detail, there is shown a block diagram of a battery backup system embodying the present invention for supplying a DC output signal to a load in the event of a failure of an AC power input or a main DC power supply failure. The AC power line 2 is connected to the input terminals of a conventional power supply 4 used as a battery charger through a filter 5 used for transient protection. A power outage and control circuit 6 has an AC line monitor for detecting zero crossings of the AC input signal, shown in FIG. 2 and described more fully hereinafter, which is also coupled to the input AC line 2 through a second filter 8. This control circuit 6 switches in a backup battery 10 based on the occurrence of either of two conditions. Specifically, if either the AC line input signal, which is normally 120 volt at 60Hz, is at a low amplitude for more than a predetermined time, e.g., at 0 ± 3V for more than 0.5 milliseconds or the AC zero line crossings are more than a predetermined time apart, e.g., 11.8 milliseconds. These two criteria are used tp assure immediate switching to the backup batteru 10 by the battery backup control logic 6.

Such a switching operation by the power outage and control logic 6 triggers a gate electrode of a high current SCR 12 arranged to complete a current conducting path to the backup battery 10 when either of the above conditions is detected. In other words, the main current conducting path through the SCR 12 is connected in series with the backup battery 10. Accordingly, a conductive state of the SCR 12 is effective to connect the battery 10 across a pair of battery backup system power output terminals +V and −V in the event of a detected AC power failure. A displacement relay 14 having its current handling contacts connected across the SCR 12 is used to turnoff the SCR by short-circuiting the current conducting path through the SCR 12 and to reduce the voltage drop between the batteries and the loads after the initial connection to the backup battery 10 is made by the aforesaid operation of the SCR 12. Specifically, the operating coil of the relay 14 is connected to the AC line 2 through the contacts of a second relay 16. The second relay 16 is maintained in an energized state by a relay operating signal from the control circuit 6. This operative state of the second relay 16 is effective maintain an operative state of the first relay 14 to keep its normally closed contacts in an open state. Upon the deenergization of the second relay 16 by the control circuit 6, the first relay 14 is deenergized and its contacts are allowed to close to provide a parallel path around the SCR 12.

Figure 3:
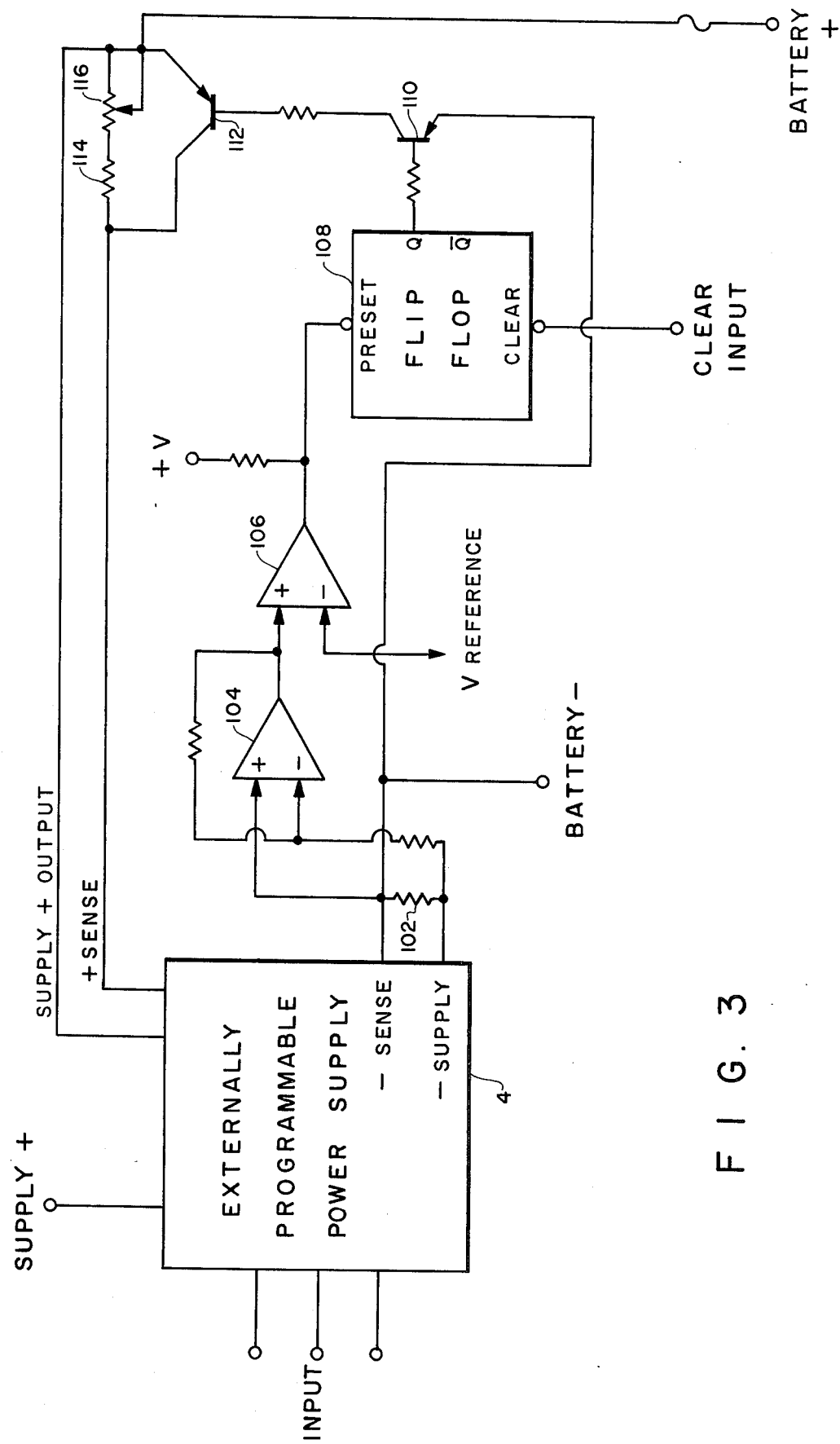
FIG. 3 is a detailed schematic of another portion of the control circuit shown in FIG. 1.

When the battery backup system operates as a result of an AC power outage, the DC voltage of a load system connected to the terminals +V and −V is maintained at a predetermined level by the backup battery power. This prevents any disturbance to the load devices operating on the backup battery power during the time that the primary source of DC power (not shown) is deenergized. When the AC power is restored, the backup battery 10 is automatically disconnected from the AC output terminal +V and −V after a short delay to permit the primary AC powered DC supply for the load devices to stabilize. The reliability of the battery backup system is increased as a result of the parallel operation of the relay 14 and the SCR 12. The SCR is rated to carry the full load current continuously in case of a relay failure and, if there is a malfunction in the control circuit 6 or the SCR 12, the relay 14 will normally connect the batteries within 100 milliseconds of an AC outage. The power supply 4 is used to charge the backup battery 10 and is connected across the battery 10 by control circuitry within the control circuit 6 as shown in FIG. 3. Additional conventional monitoring and alarm circuits (not shown) can be provided to monitor the operation of the power supply 4 and to provide an alarm signal in the event of a failure thereof while an AC input signal on the AC input terminals 2 is still present.

The +V output terminal is connected to the positive side of the backup battery 10 through a relay coil of a third relay 18. The third relay coil 18 is arranged to operate a pair of relay contacts as an indication of battery current flowing therein. This contact closure can be compared with the state of the AC line to determine whether or not a false triggering of the SCR 12 and the relay 14 has occurred. While this circuit would be a part of the control circuit 6, its structure and operation does not form a part of the present invention and it will not be described further. A circuit breaker 20 for protecting the backup battery 10 is provided in the battery circuit along with a battery maintenance switch 22 for selectively disconnecting the battery 10 during a maintenance operation. A "clear", or reset, signal input terminal 24 is provided for the control circuit 6 to provide for the application of a reset signal to the control circuit 6 in the event of a failure of the control circuit 6 to disconnect the battery 10 upon the restoration of the AC power following an outage thereof.

Referring now to FIG. 2, there is shown a detailed circuit schematic for the AC monitoring part of the control circuit 6 shown in FIG. 1. A detailed circuit schematic for a portion of the control circuit 6 related to controlling the power supply 4 is shown in FIG. 3 and will be discussed in detail hereinafter. The AC input signal passed by the second filter 8, shown in FIG. 1, is applied to an AC line monitor 30 through input terminals 32. The monitor 30 may be any suitable device for producing an output signal representative of zero crossings of an AC input signal, such devices being well-known in the art. For example, a suitable device is a Type CA-3059 integrated circuit, zero-voltage switch, manufactured by RCA, Inc. of Somerville, New Jersey. This circuit is self-powered from the AC line it is monitoring and produces zero crossing output pulses each having a duration dependent on the rise time of the AC signal being monitored, e.g., 150 microseconds for a 120b volt, 60 Hz input.

The output signal of the AC monitor 30 is applied to the input of a so-called opto-isolator 34. The pulses from the AC line monitor 30 are transferred through the opto-isolator 34 and are checked for pulse frequency and duration by the power outage detection logic. A timer 36 is used as a missing pulse detector to monitor the AC line frequency. The timer 36 may be any suitable device for producing a fixed duration output signal after a time delay following the application of an input signal, such devices being well-known in the art. The time constant or, time delay, for the timer 36 is set by a capacitor 38 and a resistor 40 connected in a series circuit between a source +V and ground. A transistor 42 has its emitter-collector path connected across the capacitor 38 while its base is arranged to be driven by an output signal from the opto-isolator 34 after a logic inversion through logical inverters 44 and 46. Concurrently, an input signal is applied to the timer from the opto-isolator 34. Under normal or proper AC frequency conditions, the transistor 42 discharges the capacitor 38, which is being charged through resistor 40, before the voltage on the capacitor 38 reaches the threshold of the timer 36. However, if the frequency of the AC line crossings decreases, the threshold of the timer will be reached and the timer will produce an output signal on its output circuit. This output signal is applied as one input of a two-input NOR gate 48.

Concurrently, a separate circuit is arranged to monitor the pulse width of the signal derived from the opto-isolator 34. A single-shot multivibrator is arranged to have an output signal from the opto-isolator 34 applied as a trigger signal to the input of the multivibrator 50. The output of the multivibrator 50 is compared with the output of the opto-isolator 34 by a NAND gate 52. Thus, the output of the multivibrator 50 is applied to the NAND gate concurrently with a direct output from the opto-isolator 34. The output of the opto-isolator 34 is delayed through a plurality of logical inverters 52, 54, 56, 58 and 60 to compensate for the propagation time of the multivibrator 50. If the pulse width of the output signal from the opto-isolator 34 exceeds the pulse width of the multivibrator 50, an output signal from the NAND gate 52 is arranged to set a d-flip-flop 62. For example, the pulse width of the single-shot 50 is arranged to be approximately 508 microseconds while, as previously mentioned, the pulse width of the output from the line monitor circuit 30 is 150 milliseconds for a normal AC input. The outputs from the pulse width and frequency measuring circuits are applied to the NOR gate 48 whereby a low level output from either monitor circuit indicating a deficiency in either of the measured criteria will produce an output signal from a second timer circuit 64.

The input pulse for the second timer circuit 64 is obtained from a differentiator circuit including a second NAND gate 66 and a plurality of series connected inverters 68, 70, 72, 76 and 78. The differentiator circuit is required to generate a short trigger pulse, by delaying the triggering of the NAND gate 66, for the second timer 64 which may operate inaccurately if triggered by an input signal of longer duration than the output pulse width of the line monitor 30. The output signal from the timer 64 is amplified by amplifier circuit 80 and is applied to the gate electrode of the SCR 12 shown in FIG. 1. In order to provide high noise immunity to prevent false triggering of the SCR 12, the amplifier circuit has an output transistor 82 which is normally "on" by means of an inverted output signal from the timer 64 through a logical inverter 84. The "on" condition of transistor 82 is effective to short the gate electrode of the SCR 12 to ground through the collctor-emitter path thereof. Concurrently, a second transistor 86 connected to the collector of the first transistor 82 is maintained in an "off" condition by a conducting state of a third transistor 88 connected to the base of the second transistor 86. When the output signal from the timer 64 is applied to the base of the third transistor 88, it is turned "off" while the second transistor 86 is turned on. Concurrently, the first transistor 82 is turned off by the base signal applied through the logical inverter 84. This state of the circuit connects the gate electrode of the SCR 12 to a source +V through a current limiting resistor 90. The gate current is applied to the SCR 12 for a predetermined period of time to keep the SCR triggered and in a conducting state while the contacts of the relay 14 are achieving a steady state condition.

The backup battery 10 is maintained across the output terminals +V and −V for a predetermined period of time, e.g., 6 seconds, after the AC line is restored to allow the power supplies normally supplying the load devices connected to the terminals +V and −V to stabilize. This delay function is accomplished by a third timer circuit 92. The third timer 92 is triggered when the output signal from the NOR gate 48 goes low by the aforesaid checking of the AC line following a restoration of the AC power. The output signal from the third timer 92 is applied to a second NOR gate 94. The output signal from the second NOR gate 94 is applied through a logical inverter 96 to the base of a transistor 98. When the output signal from the timer 92 is applied to the NOR gate 94, it is effective to turn on the transistor 98. The transistor 98 is applied to the relay coil of relay 16 to maintain the relay 16 in an energized state. In the energized state relay 16 is effective to disconnect the relay coil 14 from the AC source whereby the contact of the relay coil 14 are kept in their normally closed state to maintain the circuit path for the backup 10 during the delay time interval.

In FIG. 3, there is shown a portion of the control circuit 6 which is used to control the backup battery charging rate of the power supply 4. The charging rate control circuit shown in FIG. 3 automatically changes the output voltage of the power supply 4 used to charge the backup battery 10 in response to the charging current being delivered to the backup battery 10. The power supply 4 may be any suitable power supply of the so-called externally programmable type, such power supplies being well-known as exemplified by the power supply manufactured by the Lambda Electronics Corporation of Melville, Long Island, New York, and identified as Type LOS-W-28. Such an externally programmable power supply can be programmed, or adjusted, to change its output voltage and, consequently, its charging rate by adding resistance between the + output and + sense terminals of the power supply. In the circuit shown in FIG. 3, the addition and subtraction of a resistor between the supply + and sense + output lines of the power supply 4 is performed automatically by sensing the output current from the power supply 4. A current sense resistor 102 is connected between the − sense and − supply output lines of the power supply 4 to sense the charging current being supplied to the backup battery 10 which has its negative terminal connected through the sense resistor 102 to the − supply output of the power supply 4. The positive terminal of the battery 10 is connected directly to the + supply terminal of the power supply 4.

The voltage drop across the sense resistor 102 is applied to a first operational amplifier 104 to provide a fixed gain of the signal derived from the sense resistor 102. The output of the first amplifier 104 is applied to the non-inverting input of a second operational amplifier 106. A reference signal "V ref" is applied to the inverting input of the operational amplifier 106 to be compared with the output from the first amplifier 104. The output from the second amplifier 106 switches from a low level state to a high level state at a threshold level representative of the difference between the input signal when compared with the signal from the reference supply V ref. The output signal from the second amplifier 106 is connected to the "preset" input of a flip-flop 108 whereby a logical low level output signal from the second amplifier 106 presets the flip-flop 108 to produce a high level output signal from the "Q" output. This high level output signal is applied to the base of a first transistor 110 to place this transistor in a conducting state. When the first transistor 110 is in a conducting state a signal from the collector is applied to the base of a second transistor 112 to place this transistor in a conducting state. The collector-emitter path of the second transistor 112 is connected across a pair of resistors 114 and 116 which are connected in series between the + output and + sense lines of the power supply 4. The conducting state of the second transistor 112 is effective to short-circuit these resistors and to change the net resistance between the + output and + sense lines of the power supply 4. With these resistors output of the circuit, the output voltage of the power supply 4 is changed to a so-called "float-rate" to prevent overcharging of the battery 10.

When an AC power outage is detected by the monitor circuit 30, shown in FIG. 2, a signal from a suitable connection to the control circuit shown in FIG. 2, e.g., from the output of one of the inverters 68, 70, 72, 76 and 78 or from an external source (not shown) is applied to the "clear" input of the flip-flop 108. The "clear" input signal changes the state of the flip-fkip 108 to remove the high level "Q" output signal from the base of the first transistor 110. This state of the flip-flop 108 turns off the first transistor 110 and, consequently, the second transistor 112 to remove the short-circuit around the resistors 114 and 116. The power supply output voltage is now set by the resistors 114 and 116 which have been restored to the circuit between the + output and + sense lines of the power supply 4. When these resistors are reintroduced into the circuit, the power supply 4 is set to a "high-rate" voltage to quickly recharge the backup battery 10 when the AC power is restored.

The power supply output voltage is held at the "high-rate" setting until the charging current detected by the sensing resistor 102 drops below the current necessary to produce a logical low level signal from the second amplifier 106, as described above. At this time, the second amplifier 106 presets the flip-flop 108 for a repetition of the operation described above to restore the "float-rate" charge condition. It should be noted that in the event of an AC outage, the battery charging supply 4 will cease to function and the dual charging rate operation described above will be inapplicable until the circuits are repowered. During the AC outage, the backup battery 10 is connected to the load devices by the relay 14 to supply the critical DC power. Further, the backup battery 10 continues to supply power to the circuits in backup system by means of a local power supply (not shown) that is continuously powered by the battery 10 and by the power supply 4 when it is operative. Thus, the AC monitoring function will be continued although the relay 14 will continue to connect the battery 10 to the load devices during the AC outage condition.

Accordingly, it may be seen that there has been provided, in accordance with the present invention an improved battery backup system for an AC powered DC supply wherein the operation of the backup system is independent of the operation of the AC powered DC supply.

The embodiments of the invention in which an exclusive property or privilege is claimed are defined as follows:

1. A backup system for supplying backup DC power to replace AC supplied DC power to a load during a failure of the AC supplied DC power comprising
a pair of output terminals,
a backup DC source,
switching means for selectively connecting said DC source across said output terminals,
control means for selectively operating said switching means in response to an input signal,
AC line monitoring means including means for checking the frequency of an AC line signal used for the AC supplied DC power, means for checking the rise time of said AC line signal and means responsive to said means for checking the frequency and said means for checking the rise time to produce an output signal indicative of an error in either the rise time or frequency of said AC line signal and
means for applying said output signal as an input signal to said switching means to operate said switching means to connect said backup DC source across said output terminals.

2. A backup system as set forth in claim 1 wherein said switching means includes an SCR having its current conducting path connected between one side of said DC source and one of said terminals and its gate electrode connected to said last-mentioned means.

3. A backup system as set forth in claim 2 wherein said switching means further includes a displacement relay means for selectively providing a current conducting circuit across said current conducting path of said SCR to selectively short-circuit said SCR and relay coil means for operating said relay means in response to output signal after the operation of said SCR by said first-mentioned means for applying to short-circuit said SCR.

4. A backup system as set forth in claim 3 wherein said relay coil means includes means for delaying the operation of said relay means to remove the short-circuit from said SCR after the termination of said output signal.

5. A backup system as set forth in claim 1 wherein said means for checking the frequency includes means for converting said AC line signal to a pulse at each zero crossing of said AC line signal, said pulses each having pulse durations corresponding to a respective rise time of said AC line signal and means for checking the spacing of said pulses including a signal producing means, a capacitor means, capacitor charging means connected to said capacitor means, selectively operable capacitor discharging means connected to said capacitor means, means connecting said capacitor means as a control means for supplying a predetermined level triggering signal to said signal producing means, and means for applying said pulses to said capacitor discharging means to discharge said capacitor means during the duration of said pulses to prevent said capacitor means from supplying said predetermined signal level.

6. A backup system as set forth in claim 5 wherein said means for checking the rise time includes means for checking the duration of each of said pulses including a multivibrator means for producing a fixed frequency signal, a signal duration comparison means, means for applying said frequency signal to said comparison means and means for applying said pulses to said comparison means to counterbalance said frequency signal, said comparison means producing an output signal indicative of a lack of a counterbalance of said fixed frequency signal by said pulses.

7. A backup system as set forth in claim 6 wherein said comparison means includes a NAND gate arranged to receive said fixed frequency signal and said pulses and a flip-flop having an input connected to an output of said NAND gate to be set by an output from said NAND gate.

8. A backup system as set forth in claim 7 wherein said means responsive includes an OR gate arranged with a first input connected to an output of said flip-flop and a second input connected to an output of said signal producing means.

9. A backup system as set forth in claim 1 wherein said DC source is a battery and including a battery charging means connected to the AC line and to said battery and arranged to automatically switch a battery charging operation between a high charging rate and a low charging rate.

10. A backup system as set forth in claim 1 wherein said means for applying said output signal includes delay means for preventing the removal of said output signal from said switching means for a predetermined period of time following the detection of an error-free AC line signal subsequent to an AC line signal error detection.

* * * * *